US012608016B2

(12) United States Patent
Hirohashi et al.

(10) Patent No.: US 12,608,016 B2
(45) Date of Patent: Apr. 21, 2026

(54) INFORMATION PROCESSING DEVICE, INFORMATION PROCESSING METHOD, AND COMPUTER PROGRAM

(71) Applicant: OMRON CORPORATION, Kyoto (JP)

(72) Inventors: Yuki Hirohashi, Kyoto (JP); Yosuke Naruse, Kyoto (JP); Hiroshi Tasaki, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 77 days.

(21) Appl. No.: 18/704,121

(22) PCT Filed: Nov. 1, 2022

(86) PCT No.: PCT/JP2022/040931
§ 371 (c)(1),
(2) Date: Apr. 24, 2024

(87) PCT Pub. No.: WO2023/085179
PCT Pub. Date: May 19, 2023

(65) Prior Publication Data
US 2024/0427344 A1    Dec. 26, 2024

(30) Foreign Application Priority Data

Nov. 9, 2021    (JP) ................................. 2021-182662

(51) Int. Cl.
*G05D 1/246*    (2024.01)
*G01C 21/20*    (2006.01)
(Continued)

(52) U.S. Cl.
CPC ......... *G05D 1/2462* (2024.01); *G01C 21/206* (2013.01); *G05B 19/4155* (2013.01);
(Continued)

(58) Field of Classification Search
CPC ...... G05D 1/2462; G05D 1/639; G05D 1/246; G05D 1/693; G05D 2109/10;
(Continued)

(56) References Cited

U.S. PATENT DOCUMENTS

| | | | |
|---|---|---|---|
| 5,283,739 A | 2/1994 | Summerville et al. | |
| 2013/0103552 A1 | 4/2013 | Hoffman et al. | |
| 2021/0041243 A1* | 2/2021 | Fay ...................... | G05D 1/0248 |

FOREIGN PATENT DOCUMENTS

| | | | | |
|---|---|---|---|---|
| CN | 111353701 A | 6/2020 | | |
| CN | 114355888 A * | 4/2022 | ........... | G05D 1/0221 |

(Continued)

OTHER PUBLICATIONS

Wang et al.; Wide Range Global Path Planning for a Large Number of Networked Mobile Robots based on Generalized Voronoi Diagrams; 3rd IFAC Symposium on Telematics Applications The International Federation of Automatic Control Nov. 11-13, 2013. Seoul, Korea; pp. 107-112 (Year: 2013).*

(Continued)

*Primary Examiner* — Michael J Zanelli
(74) *Attorney, Agent, or Firm* — Morgan, Lewis & Bockius LLP

(57) ABSTRACT

The present disclosure provides an information processing device including an acquisition unit, a processing unit and an output unit.

11 Claims, 21 Drawing Sheets

(51) Int. Cl.

| | |
|---|---|
| *G05B 19/4155* | (2006.01) |
| *G05D 1/639* | (2024.01) |
| *G05D 1/693* | (2024.01) |
| *G05D 107/70* | (2024.01) |

(52) U.S. Cl.
CPC .............. *G05D 1/639* (2024.01); *G05D 1/693* (2024.01); *G05B 2219/40518* (2013.01); *G05D 2107/70* (2024.01)

(58) Field of Classification Search
CPC ...... G05B 19/4155; G05B 2219/40518; G09B 29/007; G01C 21/005; G01C 21/206; G01C 21/383; G08G 1/09
See application file for complete search history.

(56) References Cited

FOREIGN PATENT DOCUMENTS

| | | |
|---|---|---|
| JP | H04-081905 A | 3/1992 |
| JP | 2003-140747 A | 5/2003 |
| JP | 2005-032196 A | 2/2005 |
| JP | 2020-187551 A | 11/2020 |
| WO | 2021/181630 A1 | 9/2021 |

OTHER PUBLICATIONS

International Search Report and Written Opinion dated Jan. 10, 2023, for corresponding International Patent Application No. PCT/JP2022/040931.

Digani et al., "Ensemble Coordination Approach in Multi-AGV Systems Applied to Industrial Warehouses", IEEE Transactions On Automation Science and Engineering, vol. 12, No. 3, Jul. 2015, pp. 922-934.

Extended European Search Report issued in corresponding European Patent Application No. 22892678.8, dated Aug. 11, 2025.

* cited by examiner

FIG.1

START

ACCEPT ENTRY OF
SPECIFICATION INFORMATION — S101

EXTRACT OPEN SPACE
CANDIDATE POINTS — S102

SELECT OPEN SPACES FROM
EXTRACTED OPEN SPACE CANDIDATE POINTS — S103

CALCULATE OPEN SPACE
CAPACITIES — S104

DEFINE EDGES EXCLUDING
OPEN SPACES — S105

COMPUTE MEETING
CONDITIONS OF EDGES — S106

OUTPUT GENERATED NODES AND
EDGES AS A DATA STRUCTURE — S107

END

FIG.4

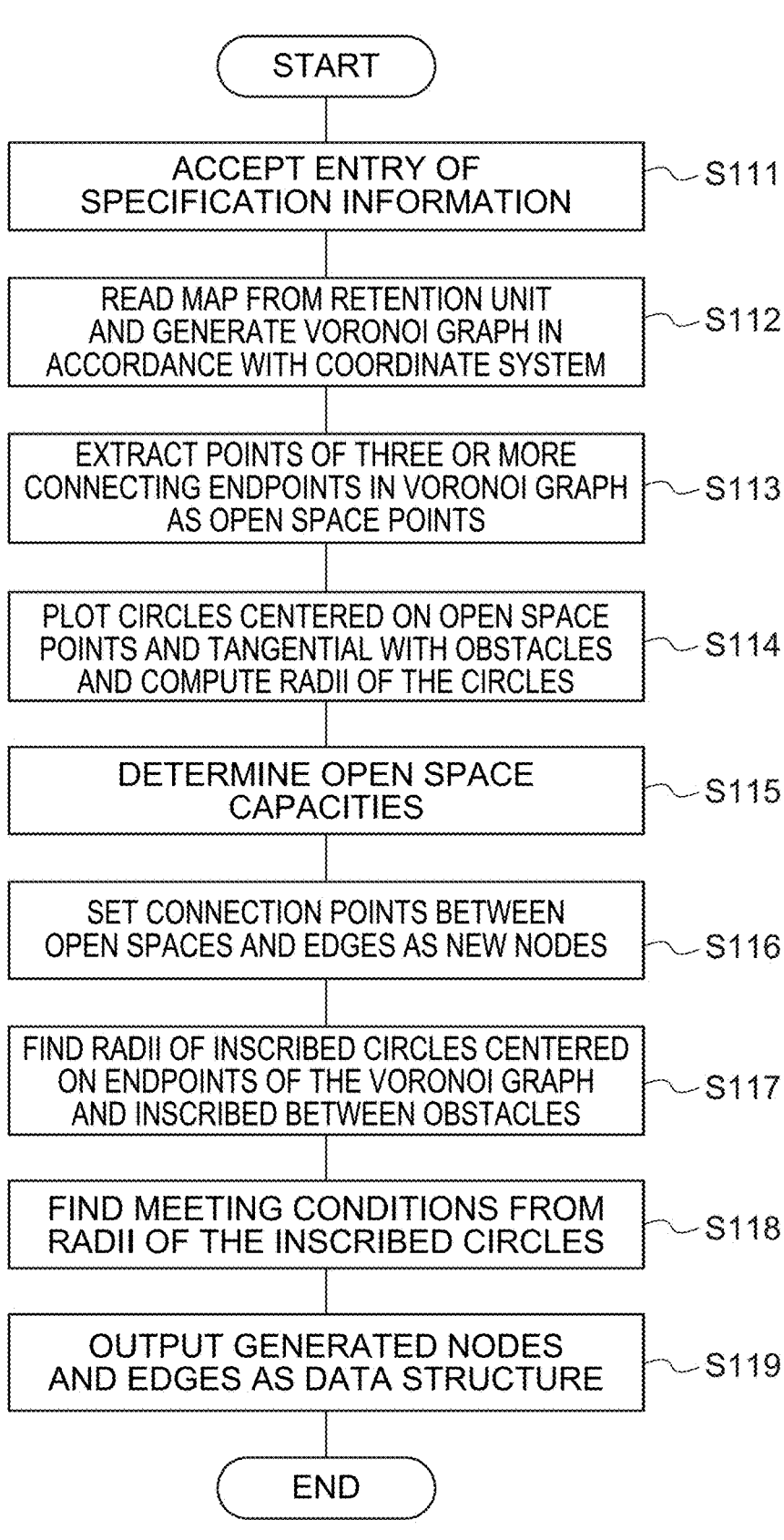

START

ACCEPT ENTRY OF SPECIFICATION INFORMATION    ∽ S111

READ MAP FROM RETENTION UNIT AND GENERATE VORONOI GRAPH IN ACCORDANCE WITH COORDINATE SYSTEM    ∽ S112

EXTRACT POINTS OF THREE OR MORE CONNECTING ENDPOINTS IN VORONOI GRAPH AS OPEN SPACE POINTS    ∽ S113

PLOT CIRCLES CENTERED ON OPEN SPACE POINTS AND TANGENTIAL WITH OBSTACLES AND COMPUTE RADII OF THE CIRCLES    ∽ S114

DETERMINE OPEN SPACE CAPACITIES    ∽ S115

SET CONNECTION POINTS BETWEEN OPEN SPACES AND EDGES AS NEW NODES    ∽ S116

FIND RADII OF INSCRIBED CIRCLES CENTERED ON ENDPOINTS OF THE VORONOI GRAPH AND INSCRIBED BETWEEN OBSTACLES    ∽ S117

FIND MEETING CONDITIONS FROM RADII OF THE INSCRIBED CIRCLES    ∽ S118

OUTPUT GENERATED NODES AND EDGES AS DATA STRUCTURE    ∽ S119

END

FIG.7

| NODE ID | v2 |
|---|---|
| COORDINATES | (x,y) |
| CONNECTED OS-ID | A1 |

| OS-ID | A1 |
|---|---|
| CAPACITY | 4 |
| SURFACE AREA | 120 |
| CONNECTED NODE-IDS | {v2,v3,v4,v5} |

| EDGE ID | e1 |
|---|---|
| START POINT | v1 |
| END POINT | v2 |
| MEETING CONDITION | 3 |
| LENGTH | 220 |

FIG.8
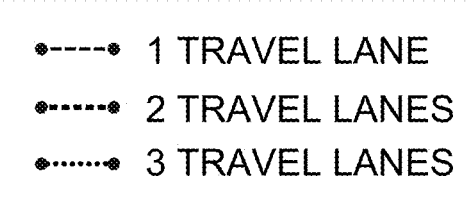
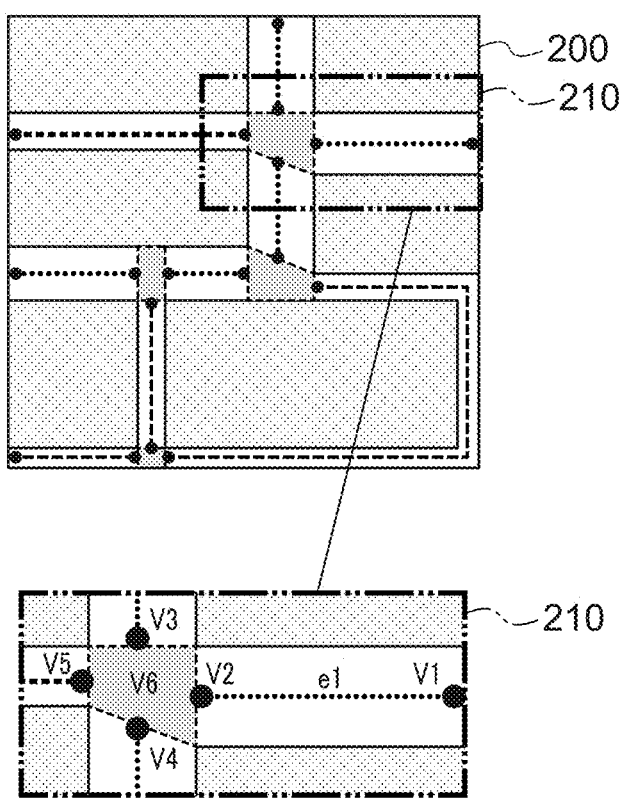

FIG.9

| | |
|---|---|
| EDGE ID | e1 |
| START POINT | v1 |
| END POINT | v2 |
| MEETING CONDITION | 3 |
| LENGTH | 220 |

| | |
|---|---|
| ID | v2 |
| COORDINATES | (x,y) |
| SURFACE AREA | – |
| CAPACITY | – |
| CONNECTED IDS | v6 |
| ATTRIBUTE | NODE |

| | |
|---|---|
| ID | v6 |
| COORDINATES | – |
| SURFACE AREA | 120 |
| CAPACITY | 4 |
| CONNECTED IDS | {v2,v3,v4,v5} |
| ATTRIBUTE | OPEN SPACE |

FIG.13

| NODE ID | v2 |
|---|---|
| COORDINATES | (x,y) |
| CONNECTED OS-ID | A1 |

| OS-ID | A1 |
|---|---|
| SURFACE AREA | 120 |
| CAPACITY | 4 |
| CONNECTED NODE-IDS | {v2,v3,v4,v5} |
| CONSTRAINTS | {SPEED LIMIT:0.5m/s, PRIORITY PASSAGE LINE:[[x1,y1],[x2,y2],[x3,y3]]} |

| EDGE ID | e1 |
|---|---|
| START POINT | v1 |
| END POINT | v2 |
| MEETING CONDITION | 3 |
| LENGTH | 220 |
| CONSTRAINTS | {SPEED LIMIT: 0.5m/s, RIGHT SIDE PASSING:[[x1,y1],[x2,y2],[x3,y3],[x4,y4]]} |

FIG.15

INFORMATION PROCESSING DEVICE, INFORMATION PROCESSING METHOD, AND COMPUTER PROGRAM

TECHNICAL FIELD

The present invention relates to an information processing device, an information processing method and a computer program.

BACKGROUND ART

Technologies for using a predetermined map to generate a movement plan for a mobile robot have been proposed. For example, Patent Reference 1 discloses a technology that: uses a geometric map of objects in an environment to generate a grid map representing a distribution of spaces occupied by objects that stochastically represents positions and attitudes; uses distances corresponding to uncertainties in the positions and attitudes of the objects from the grid map to generate a Voronoi diagram; and, using collision probabilities with objects in the Voronoi diagram and path lengths as costs, performs a search for a path from an assigned start point to a destination.

RELATED ART REFERENCES

Patent References

Patent Document 1: Japanese Patent Application Laid-Open (JP-A) No. 2005-032196

SUMMARY OF INVENTION

Technical Problem

A conventional technology uses a geometric map of objects in an environment to generate a movement plan for a mobile robot, but gives no consideration to a movement plan for plural mobile robots. In order to manage a collection of mobile robots without complexity, one-way areas and restricted-number areas are provided in the geometric map and paths avoiding previous mobile robots are formed. However, suitably specifying avoidance paths requires human labor and is inefficient.

The present invention is devised in consideration of the matter described above. An object of the present invention is to provide an information processing device, an information processing method and a computer program that output a data structure that may manage a collection of mobile robots more efficiently than conventional technology.

Solution to Problem

In order to achieve the object described above, an information processing device according to the present invention includes: an acquisition unit that acquires a map that distinguishes a passable area for mobile robots from an impassable area and information relating to a size of the robots; a processing unit that divides the passable area of the map into a first area in which a travel direction of the robots is determined and a second area in which a travel direction of the robots is not determined, and uses the information relating to the size of the robots to generate a predetermined data structure storing information on whether or not the robots can pass by each other in the first area as first area information and storing information on a number of the robots that can be present simultaneously as second area information; and an output unit that outputs the data structure generated by the processing unit. Thus, the information processing device may output a data structure that may manage a collection of mobile robots efficiently.

The processing unit may store information relating to a limit on movements of the robots in the first area or the second area in the data structure. Thus, the information processing device may output information relating to limits on movements of the robots.

The acquisition unit may acquire information relating to the limit that is entered by a user. Thus, the information processing device may output information relating to limits entered by a user.

The processing unit may store information of a surface area of the second area in the data structure as the second area information. Thus, the information processing device may output information on the surface area of an area in which no travel direction of the robots is determined.

The processing unit may store information relating to a progress direction of the robots in the data structure as information relating to the first area. Thus, the information processing device may output information relating to progress directions of the robots.

The processing unit may extract the second area from the passable area, and extract the first area from the passable area excluding the extracted second area. Thus, the information processing device may set areas that are not areas in which travel directions of the robots are not determined to be areas in which travel directions of the robots are determined.

The acquisition unit may acquire information relating to sizes of the robots that differs between types of the robots. Thus, the information processing device may output a data structure based on the information relating to the sizes of the robots.

The information processing device may further include a display control unit that causes the map to be displayed, the displayed map reproducing information stored in the data structure. Thus, the information processing device may visually present the information stored in the data structure in a map.

The processing unit may generate a path plan of the robots based on of information stored in the data structure. Thus, the information processing device may generate path plans for robots from the information stored in the data structure.

In order to achieve the object described above, an information processing method according to the present invention includes: acquiring a map that distinguishes a passable area for mobile robots from an impassable area and information relating to a size of the robots; generating a predetermined data structure, including dividing the passable area of the map into a first area in which a travel direction of the robots is determined and a second area in which a travel direction of the robots is not determined, and using the information relating to the size of the robots to generate the data structure, the data structure storing information on whether or not the robots can pass by each other in the first area as first area information and storing information on a number of the robots that can be present simultaneously as second area information; and outputting the generated data structure. Thus, the information processing method may output a data structure that may manage a collection of mobile robots efficiently.

In order to achieve the object described above, a computer program according to the present invention causes a computer to execute processing including: acquiring a map that distinguishes a passable area for mobile robots from an impassable area and information relating to a size of the robots; generating a predetermined data structure, including dividing the passable area of the map into a first area in which a travel direction of the robots is determined and a second area in which a travel direction of the robots is not determined, and using the information relating to the size of the robots to generate the data structure, the data structure storing information on whether or not the robots can pass by each other in the first area as first area information and storing information on a number of the robots that can be present simultaneously as second area information; generating the predetermined data structure storing the first area information and the second area information; and outputting the generated data structure. Thus, the computer program may output a data structure that may manage a collection of mobile robots efficiently.

Advantageous Effects of Invention

According to the present invention, an information processing device, information processing method and computer program may be provided that utilize information on sizes of mobile robots to output a data structure that may manage a collection of the mobile robots more efficiently than conventional technology.

BRIEF DESCRIPTION OF DRAWINGS

FIG. 1 is a block diagram showing hardware structures of an information processing device according to an exemplary embodiment.

FIG. 4 is a flowchart showing a flow of information processing by the information processing device.

FIG. 7 is a diagram showing an example of a data structure generated by the information processing device.

FIG. 8 is a diagram showing a state in which the information processing device extracts open spaces and edges from the map.

FIG. 9 is a diagram showing an example of a data structure generated by the information processing device.

FIG. 13 is a diagram showing an example of a data structure generated by the information processing device.

FIG. 15 is a diagram describing variations of creation of running plans for mobile robots.

DETAILED DESCRIPTION

Figure 2:
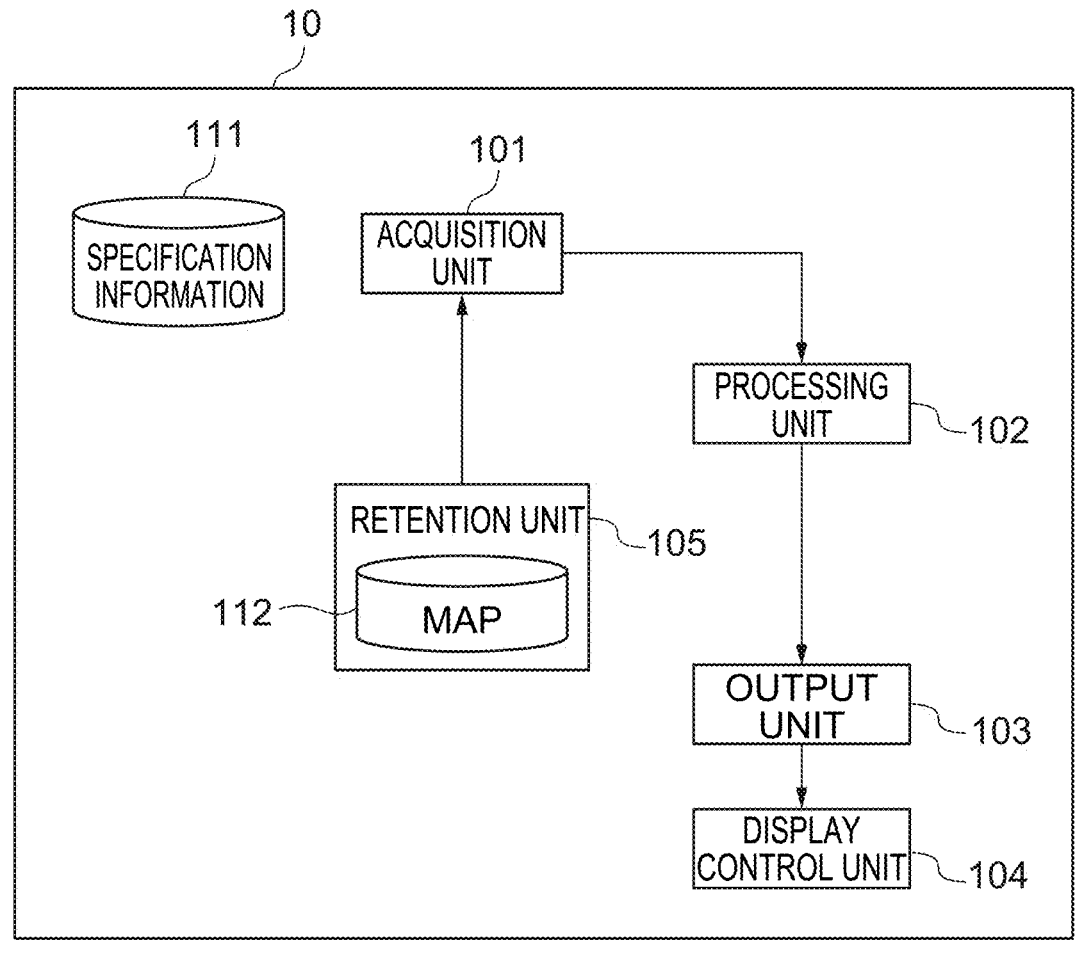
FIG. 2 is a block diagram showing an example of functional structures of the information processing device.

Below, an example of an embodiment of the present invention is described with reference to the drawings. In the drawings, the same reference symbols are assigned to structural elements and portions that are the same or equivalent. Proportional dimensions in the drawings may be exaggerated to aid understanding and may be different from actual proportions.

Figure 1:
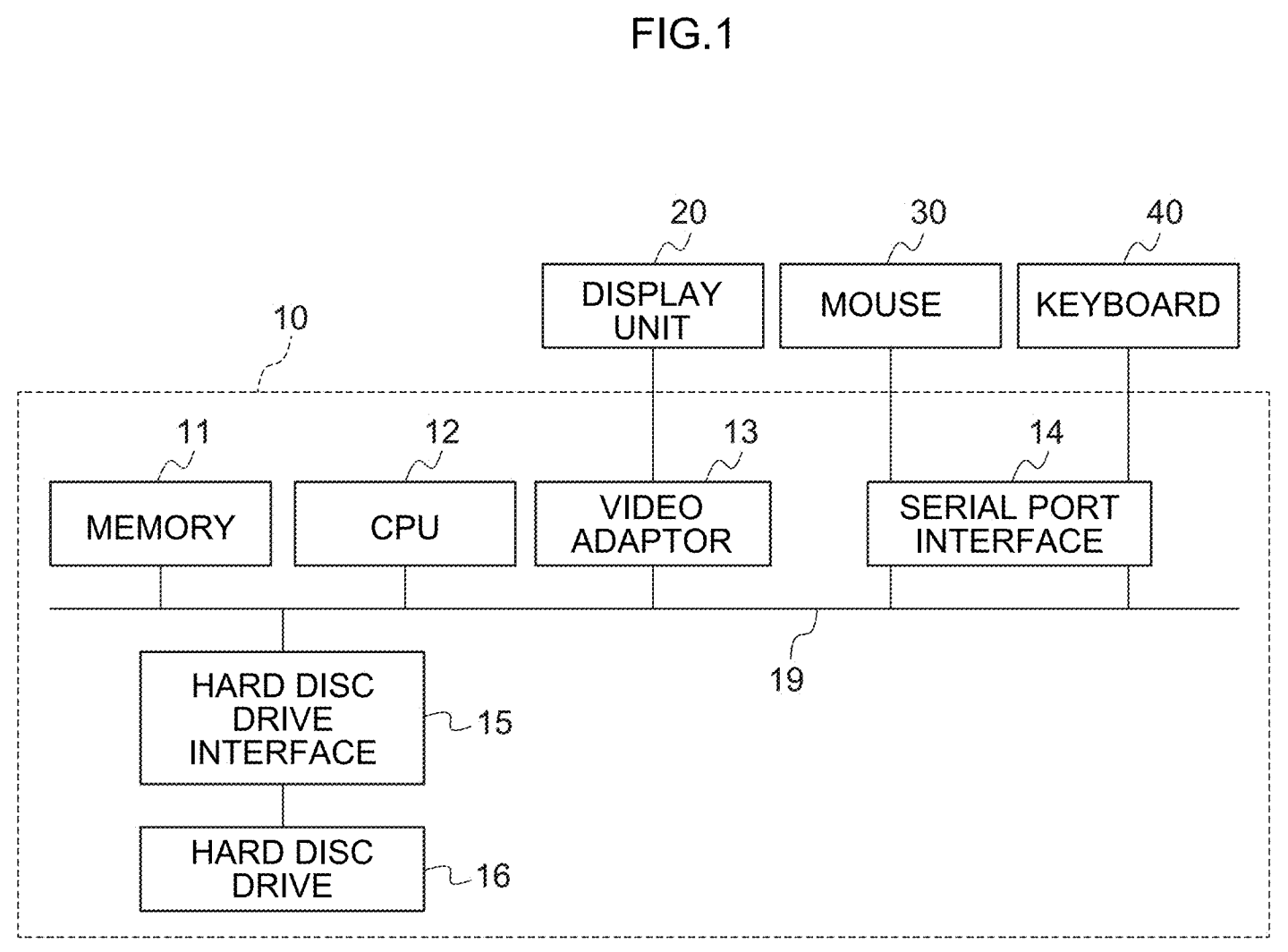

FIG. 1 is a block diagram showing hardware structures of an information processing device 10 according to the present exemplary embodiment. The information processing device 10 according to the present exemplary embodiment generates and outputs a predetermined data structure on the basis of information relating to a map, which distinguishes passable areas and impassable areas for mobile robots, and information relating to sizes of the robots. Because the information processing device 10 according to the present exemplary embodiment generates and outputs this data structure, a collection of mobile robots may be managed efficiently. Robots that are objects of control in the present exemplary embodiment are autonomous mobile robots (AMR).

As shown in FIG. 1, the information processing device 10 includes memory 11, a central processing unit (CPU) 12, a video adaptor 13, a serial port interface 14, a hard disc drive interface 15 and a hard disc drive 16. These structures are connected to be capable of communicating with one another via a bus 19.

The memory 11 is a memory device formed with, for example, read-only memory (ROM) and random access memory (RAM) or the like. The ROM memorizes various programs and various kinds of data. The RAM serves as a work area and temporarily memorizes programs and data.

The CPU 12 is a central arithmetic processing unit, which executes various programs and controls various sections. That is, the CPU 12 reads a program from the ROM of the memory 11 or the hard disc drive 16 and executes the program using the memory 11 or the RAM as a work area. The CPU 12 performs control of the structures described above and various kinds of arithmetic processing in accordance with the program recorded in the ROM of the memory 11 or the hard disc drive 16. In the present exemplary embodiment, an information processing program that generates and outputs a predetermined data structure is stored in the ROM of the memory 11 or the hard disc drive 16.

The video adaptor 13 is connected to a display unit 20. The video adaptor 13 outputs various kinds of information to the display unit 20 to be displayed at the display unit 20. The display unit 20 is any of various information display devices such as a liquid crystal display, an organic electroluminescent display or the like.

The serial port interface 14 is connected to a mouse 30 and a keyboard 40. The serial port interface 14 outputs details of entries by a user operating the mouse 30 and keyboard 40 to the CPU 12.

The hard disc drive 16 stores various programs, including an operating system, and various kinds of data. The hard disc drive 16 conducts reading and writing of the data and programs via the hard disc drive interface 15.

When the aforementioned information processing program is executed, the information processing device 10 uses the hardware resources described above to realize various functions. Functional structures realized by the information processing device 10 are now described.

FIG. 2 is a block diagram showing an example of the functional structures of the information processing device 10.

As shown in FIG. 2, as functional structures, the information processing device 10 includes an acquisition unit 101, a processing unit 102, an output unit 103, a display control unit 104 and a retention unit 105. These functional structures are realized by the CPU 12 reading and executing the information processing program memorized in the ROM of the memory 11 or the hard disc drive 16.

The acquisition unit 101 acquires a map that distinguishes passable areas and impassable areas for mobile robots (below referred to as "the mobile robots") and specification information 111 relating to sizes of the mobile robots. The map is, for example, a map in which obstacles that are impassable for the mobile robots are represented in a coordinate system, a map in which passable areas and impassable areas are represented by bits, a map formed of point group information acquired by lidar (light detection and ranging) or the like.

The processing unit 102 generates a predetermined data structure on the basis of information acquired by the acquisition unit 101. More specifically, the processing unit 102 divides passable areas for mobile robots in the map acquired by the acquisition unit 101 into edges and open spaces. An edge is an area in which a travel direction of the mobile robots is determined, and is an example of a first area recited in the present invention. An open space is an area in which a travel direction of the mobile robots is not determined, and is an example of a second area recited in the present invention.

The processing unit 102 uses the information relating to sizes of the mobile robots to determine, as edge information, passing possibility information that determines whether or not the mobile robots can pass by or overtake each other in an edge. The processing unit 102 stores passing possibility information of the edges in the predetermined data structure as meeting conditions of the edges. A meeting condition of an edge is a condition limiting whether plural mobile robots can pass by each other. Edge meeting condition information is expressed as, for example, information on a number of the mobile robots that can travel side by side at the same time or a number of the mobile robots that can pass by each other. Information on a number of robots may be represented in, for example, a format of a number of travel lanes that the mobile robots progress along side by side. That is, an edge where there is only one travel lane is an edge where the mobile robots may not travel side by side at the same time or may not pass by each other, and an edge where the number of travel lanes is two or more is an edge where the robots may travel side by side at the same time or pass by each other. Edge meeting condition information may also be expressed as information on a narrowest part of a passage. The processing unit 102 also stores information on a number of robots that may be present in an open space at the same time in the data structure as open space information. The processing unit 102 generates a data structure storing this information.

The processing unit 102 extracts open spaces from passable areas of the map and extracts edges from passable areas excluding the extracted open spaces. More specific open space and edge extraction methods are described in more detail below.

The processing unit 102 may store information in the data structure relating to constraints on movements of the mobile robots in the edges and open spaces. The information relating to constraints on movements of the mobile robots may be acquired by the acquisition unit 101. The processing unit 102 may further store information on surface areas of the open spaces in the data structure as open space information. The processing unit 102 may further store information relating to progress directions of the mobile robots in the data structure as information relating to the edges. Specific examples of information stored in the data structure are described in more detail below.

The processing unit 102 executes processing to generate movement plans of the mobile robots on the basis of the generated data structure. Generation of a movement plan of a mobile robot on the basis of the data structure is described in more detail below.

The processing unit 102 may compute passing possibility information on the basis of a minimum passage width determined for a progress direction in an edge area. The processing unit 102 may compute the capacity of an open space on the basis of the shape of the open space. The processing unit 102 may find passing possibility information and open space capacities by conducting running simulations so as to improve throughput. The meaning of the term "throughput" as used in the present exemplary embodiment is intended to encompass an operating efficiency of the mobile robots. The processing unit 102 may also find passing possibility information and open space capacities by actually running mobile robots such that throughput improves and using data obtained by the running of mobile robots.

The output unit 103 outputs a data structure generated by the processing unit 102. The data structure outputted by the output unit 103 may be stored by the retention unit 105. The display control unit 104 performs control to display a user interface at the display unit 20. More specifically, the display control unit 104 performs control to display a user interface reproducing the data structure outputted by the output unit 103 at the display unit 20. An example of the user interface displayed at the display unit 20 by the display control unit 104 is described below. The retention unit 105 retains a map 112 of a location in which the mobile robots are to move.

Because the information processing device 10 according to the exemplary embodiment of the present invention includes these structures, the information processing device 10 may output a data structure using information on the sizes of mobile robots. Because the information processing device 10 according to the exemplary embodiment of the present invention uses information on the sizes of the mobile robots, the information processing device 10 may output a data structure for managing a collection of mobile robots more efficiently than conventional technology.

Now, operation of the information processing device 10 is described.

Figure 3:
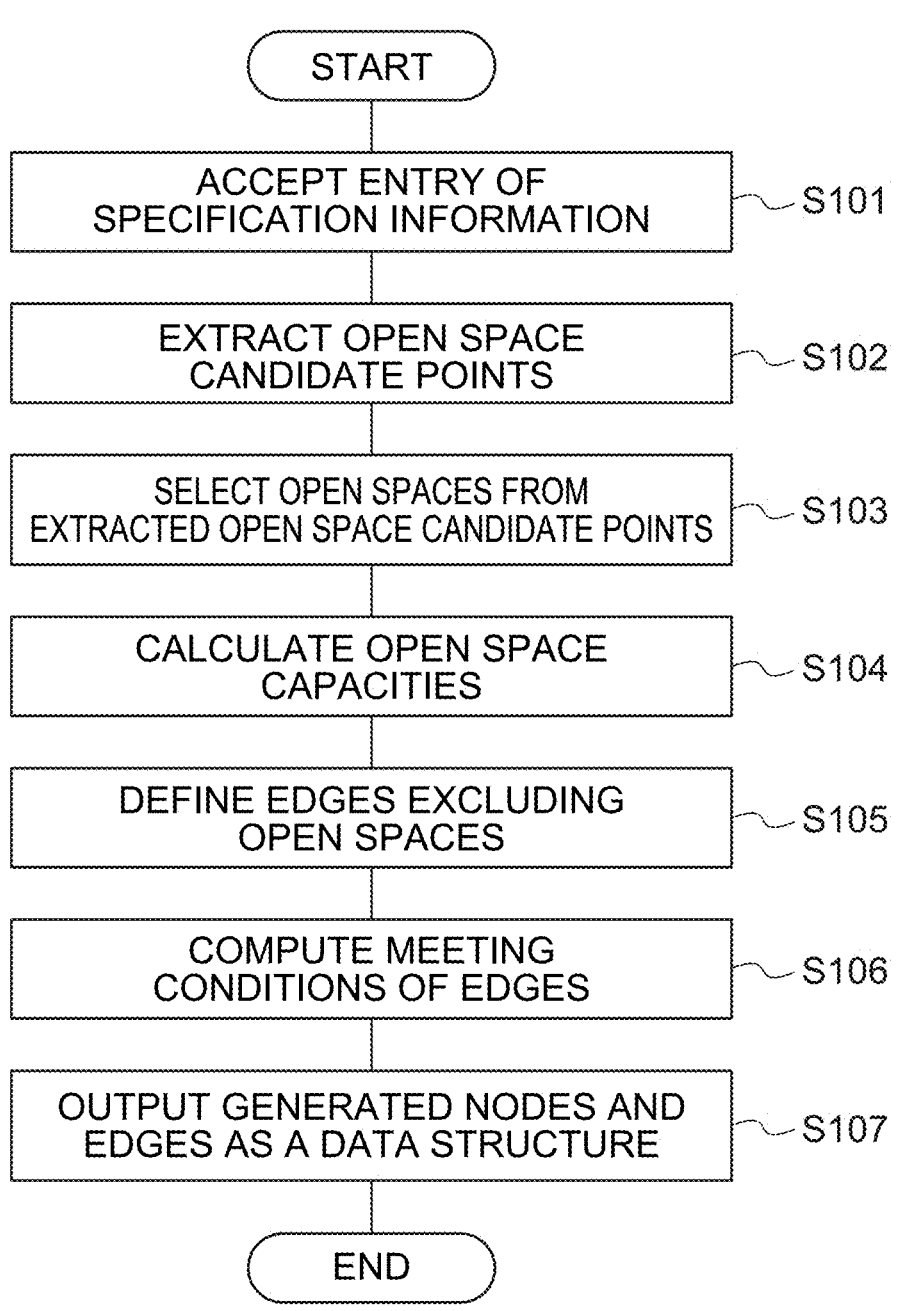
FIG. 3 is a flowchart showing a flow of information processing by the information processing device.

FIG. 3 is a flowchart showing a flow of information processing by the information processing device 10. The CPU 12 performs this information processing by reading an information processing program memorized in the ROM of the memory 11 or the hard disc drive 16, loading the information processing program into the RAM of the memory 11, and executing the information processing program.

The flowchart shown in FIG. 3 is a flowchart of processing in which the information processing device 10 outputs a data structure. First, in step S101, the CPU 12 accepts entry of specification information for output of the data structure. The entry of the specification information may be conducted by a predetermined user interface. Details of a user interface are described below. The specification information accepted by the CPU 12 in step S101 includes information relating to sizes of mobile robots. The information relating to the size of a mobile robot is, for example, information on a radius of the mobile robot when a shape of the mobile robot is circular or information on the radius of a circumscription circle of the mobile robot when the shape of the mobile robot is not circular. The CPU 12 may also accept information of a buffer distance from walls of passages that the mobile robot is to move along.

When the entry of specification information has been accepted, in step S102 the CPU 12 extracts open space candidate points from areas that are passable for the mobile robots in accordance with a predetermined extraction method. A specific example of the extraction method of open space candidate points is described below.

When the open space candidate points have been extracted, in step S103 the CPU 12 selects open spaces from the extracted candidate points in accordance with a predetermined selection method. Plural open spaces may be selected. A specific example of an open space selection method is described below.

When the open spaces have been selected, in step S104 the CPU 12 calculates an open space capacity of each selected open space. The meaning of the term "open space capacity" as used herein is intended to include a number of the mobile robots that may be present in the open space at the same time. Accordingly, the CPU 12 uses the information on the sizes of the mobile robots to calculate the open space capacities.

When the open space capacities have been calculated, in step S105 the CPU 12 defines areas other than open spaces in the passable areas for mobile robots as edges.

When areas other than open spaces have been defined as the edges, in step S106 the CPU 12 computes meeting conditions of the edges in accordance with a predetermined computation method. A meeting condition of an edge is expressed as a number of the mobile robots that may travel side by side along the edge or pass by each other. A computation method of meeting conditions of edges is described below.

When the meeting conditions of edges have been computed, in step S107 the CPU 12 outputs generated nodes and edges as a data structure. A specific example of the data structure is described below.

FIG. 4 is a flowchart showing a flow of information processing by the information processing device 10. The CPU 12 performs this information processing by reading an information processing program memorized in the ROM of the memory 11 or the hard disc drive 16, loading the information processing program into the RAM of the memory 11, and executing the information processing program. The flowchart shown in FIG. 4 is a flow of information processing when the flowchart of information processing shown in FIG. 3 is implemented with a Voronoi diagram.

First, in step S111, the CPU 12 accepts entry of specification information for output of a data structure. The entry of the specification information may be conducted by a predetermined user interface.

When the entry of specification information has been accepted, in step S112 the CPU 12 reads a map from the retention unit 105 and generates a Voronoi graph of boundaries between passable areas and impassable areas for mobile robots in the map in accordance with a coordinate system.

When the Voronoi graph has been generated, in step S113 the CPU 12 extracts points for which a number of connecting endpoints of the Voronoi graph is at least three as open space points.

When an open space candidate point has been extracted, in step S114 the CPU 12 plots a circle that is centered on an open space point and tangential with an obstacle, and computes the radius of the circle. The obstacle is a boundary between a passable area and an impassable area for mobile robots such as, for example, a wall or the like.

When the radii of the circles have been computed, in step S115 the CPU 12 determines open space capacities. The CPU 12 may, for example, use the radius of each circle and a radius of the mobile robots to determine the open space capacities. For example, if the radius of a circle is not more than twice the radius of the mobile robots, only one of the mobile robots may be present in the open space at the same time, and the CPU 12 determines that the open space capacity is one.

When the open space capacities have been determined, in step S116 the CPU 12 sets connection points between the open spaces and edges as new nodes.

When the connection points between the open spaces and edges have been set as new nodes, in step S117 the CPU 12 finds a radius of an inscribed circle that is centered on an endpoint of the Voronoi graph and inscribed between obstacles.

When the radii of the inscribed circles have been found, in step S118 the CPU 12 finds meeting conditions of the edges from the radii of the inscribed circles. A meeting condition of an edge is expressed as a number of the mobile robots that may travel side by side along the edge or pass by each other. The CPU 12 may, for example, use the radius of an inscribed circle and the radius of the mobile robots to determine the meeting condition of an edge. For example, if the radius of the inscribed circle is not more than twice the radius of the mobile robots, only one of the mobile robots may pass along the edge at the same time, and the CPU 12 determines that the meeting condition of the edge is one robot.

A situation in which there are plural types of mobile robots and the sizes of the types are different is considered. Assume there are three types of mobile robots, AMR1, AMR2 and AMR3, and that the width of an AMR1 is 1.0, the width of an AMR2 is 1.5, and the width of an AMR3 is 1.7. These values are normalized using the width of AMR1 that has the smallest width as a unit. If a passage width (a number of travel lanes) is 3.0, up to three AMR Is may travel side by side or pass by each other. Meanwhile, up to two AMR2s may travel side by side or pass by each other. AMR3s cannot travel side by side or pass by each other. Two robots that are an AMR1 and an AMR2 may travel side by side and may pass by each other. Two robots that are an AMR1 and an AMR3 may travel side by side and may pass by each other. An AMR2 and an AMR3 cannot travel side by side and cannot pass by each other. Thus, the CPU 12 determines meeting conditions in accordance with the types of the mobile robots. Of course, when meeting conditions are being found, numerical values of actual sizes of the mobile robots may be used rather than normalized values of the sizes of the mobile robots.

When the meeting conditions of the mobile robots have been found from the radii of the inscribed circles, in step S119 the CPU 12 outputs generated nodes and edges as a data structure.

When the information processing device 10 according to the exemplary embodiment of the present invention executes this processing, the information processing device 10 may output a data structure using information on sizes of the mobile robots. Because the information processing device 10 according to the exemplary embodiment of the present invention uses the information on sizes of the mobile robots, the information processing device 10 may output a data structure for managing a collection of mobile robots more efficiently than conventional technology.

The CPU 12 may define open spaces by a method other than a Voronoi diagram, for example, a probabilistic road-map, a rapidly exploring random tree (RRT) or the like.

Now, an example of generation of a specific data structure by the information processing device 10 is illustrated.

Figure 5:
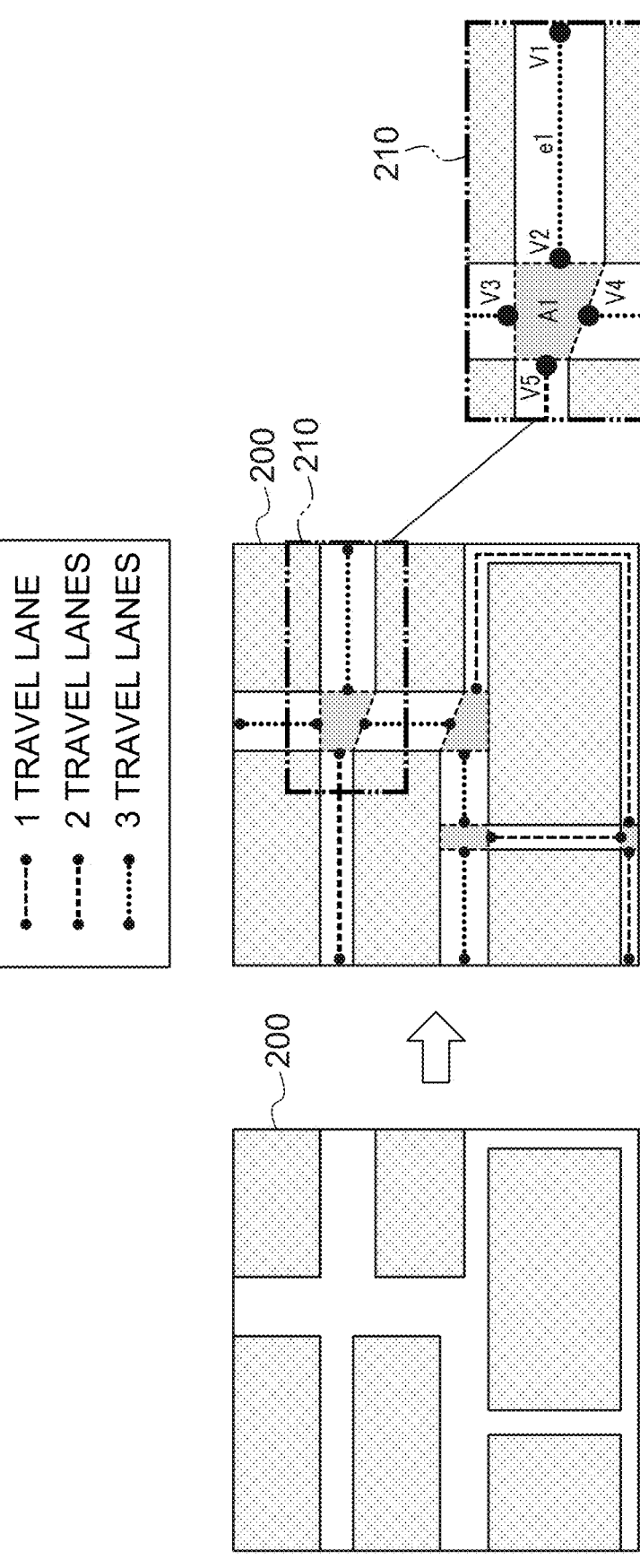
FIG. 5 is a diagram showing a state in which the information processing device extracts open spaces and edges from a map.

FIG. 5 is a diagram showing a state in which the information processing device 10 extracts open spaces and edges from a map. When a map 200 is provided to the information processing device 10, the information processing device 10 extracts open spaces and edges from the map 200. Referring to the region of the map 200 indicated with the reference symbol 210, the information processing device 10 applies an ID of the form "A1" to an open space and applies an ID of the form "e1" to an edge between nodes v1 and v2. The information processing device 10 generates information that expresses a meeting condition for each edge as a number of travel lanes. The information processing device 10 then stores the information of the open spaces and edges in a data structure. On the basis of this data structure, the information processing device 10 may visually present where open spaces are, where edges are, and what meeting conditions the edges have, as illustrated in FIG. 5.

FIG. 6A to FIG. 6J are diagrams, based on the flowchart shown in FIG. 4, showing states in which the information processing device extracts open spaces and edges from the map.

Figure 6:
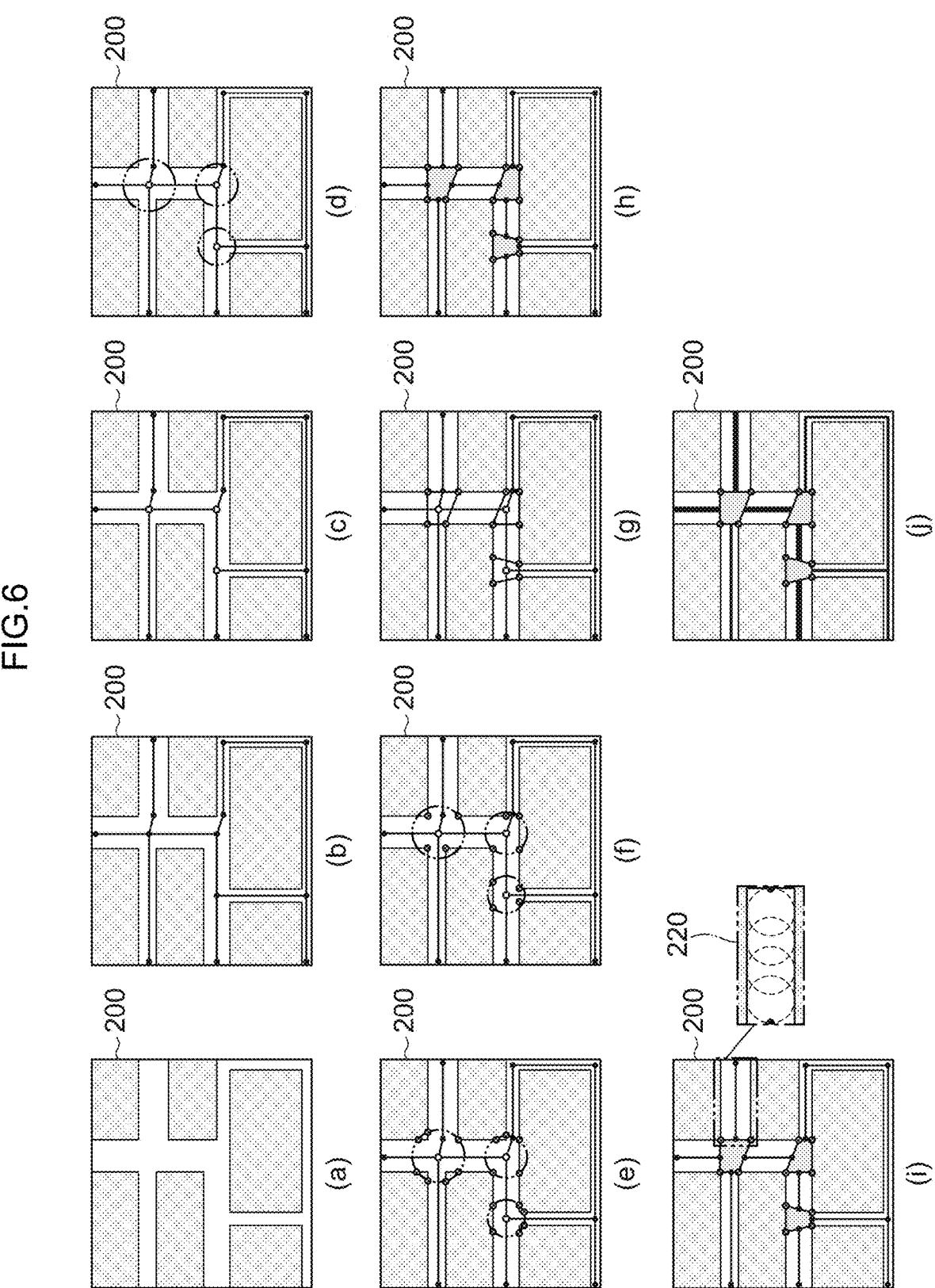
FIG. 6A to FIG. 6J are diagrams showing states in which the information processing device extracts open spaces and edges from the map.

When the map 200 as illustrated in FIG. 6A is provided to the information processing device 10, the information processing device 10 generates a Voronoi graph of boundaries between passable areas and impassable areas for mobile robots in the map in accordance with a coordinate system, as illustrated in FIG. 6B. When the Voronoi graph has been generated, as shown in FIG. 6C, the information processing device 10 extracts points where a number of connecting endpoints in the Voronoi graph is at least three as open space points. When the open space candidate points have been extracted, as illustrated in FIG. 6D, the information processing device 10 plots circles that are centered on the open space points and tangential with obstacles, and computes the radii of these circles. The obstacles are boundaries between passable areas and impassable areas for mobile robots, such as, for example, walls and the like.

When the circles that are centered on open space points and tangential with obstacles have been plotted and the radii of the circles have been computed, as illustrated in FIG. 6E, the information processing device 10 finds a number of contact points between each circle and the obstacles, and increases the radius of the circle until the number of contact points is twice the aforementioned number of connecting endpoints in the Voronoi graph. Then, as illustrated in FIG. 6F, the information processing device 10 adjusts distances between the contact points such that each distance between contact points is not less than a predetermined threshold value. As illustrated in FIG. 6G, the information processing device 10 then connects the obtained contact points with one another to generate an open space.

When capacities of the open spaces have been determined, as illustrated in FIG. 6H, the information processing device 10 sets connection points between the open spaces and the edges as new nodes. When the connection points between the open spaces and edges have been set as new nodes, as illustrated in FIG. 6I, the information processing device 10 finds radii of inscribed circles that are centered on endpoints of the Voronoi graph and inscribed between obstacles.

When the radii of the inscribed circles have been found, as illustrated in FIG. 6J, the information processing device 10 finds meeting conditions of the edges from the radii of the inscribed circles. When the information processing device 10 has found the meeting conditions for mobile robots from the radii of the inscribed circles, the information processing device 10 outputs the generated nodes and edges as the data structure. Thus, when the map 200 is provided, the information processing device 10 may output a data structure based on the content of the map 200.

FIG. 7 is a diagram showing an example of a data structure generated by the information processing device 10. The upper section of FIG. 7 is a table data structure storing information of a node. This table stores information of a node ID identifying the node, coordinates of the node, and an ID of an open space connected to the node (connected OS-ID). The values of coordinates in this table are values using an arbitrary point of the map 200 as an origin point. The middle section of FIG. 7 is a table data structure storing information of an open space. This table stores information of an ID identifying the open space (OS-ID), a capacity of the open space, a surface area of the open space, and nodes connected to the open space (connected node-IDs). The lower section of FIG. 7 is a table data structure storing information of an edge. This table stores information of an edge ID, a start point node, an end point node, a meeting condition, and a length of the edge. The start point and end point may both be nodes when a progress direction of the edge is not set. When a progress direction of the edge is set, one or other of the start point and end point is set.

Because the information processing device 10 generates and outputs the data structure in this way, on the basis of the data structure, the information processing device 10 may visually present where the open spaces are, where the edges are and what meeting conditions the edges have, as illustrated in FIG. 5.

In the example shown in FIG. 7, information on open spaces and information on edges are stored in respectively separate tables, but the present invention is not limited by this example. Information on open spaces and information on edges may be stored in the same tables.

FIG. 8 is a diagram showing a state in which the information processing device 10 extracts open spaces and edges from the map. When the map 200 is provided to the information processing device 10, the information processing device 10 extracts open spaces and edges from the map 200. Referring to the region of the map 200 indicated by the reference symbol 210, the information processing device 10 applies the ID "v6" to an open space and applies the ID "e1" to an edge between nodes v1 and v2.

FIG. 9 is a diagram showing an example of a data structure generated by the information processing device 10. The upper section of FIG. 9 is a table data structure storing information of an edge. This table stores information of an edge ID, a start point node, an end point node, a meeting condition, and a length of the edge. The start point and end point may both be nodes when a progress direction of the edge is not set. When a progress direction of the edge is set, one or other of the start point and end point is set. The middle section of FIG. 9 is a table data structure storing information of a node. This table stores information of a node ID identifying the node, coordinates of the node, an ID of an open space connected to the node (connected ID), and information on an attribute of these fields. The values of coordinates in this table are values using an arbitrary point of the map 200 as an origin point. Note also that because the concepts of capacity and surface area do not apply to a node, no values are set in the "capacity" and "surface area" fields (or null values are set). The lower section of FIG. 9 is a table data structure storing information of an open space. This table stores information of an ID identifying the open space, a surface area of the open space, a capacity of the open space, information of nodes connected to the open space (connected IDs), and an attribute of these fields. Note that the concept of coordinates does not apply to an open space and no values are set in the "coordinates" field (or null values are set).

The information processing device 10 may store this information on open spaces and information on edges in the same tables. Because the information processing device 10 generates and outputs this data structure, on the basis of the data structure, the information processing device 10 may visually present where the open spaces are, where the edges are and what meeting conditions the edges have, as illustrated in FIG. 8.

Figure 10A:
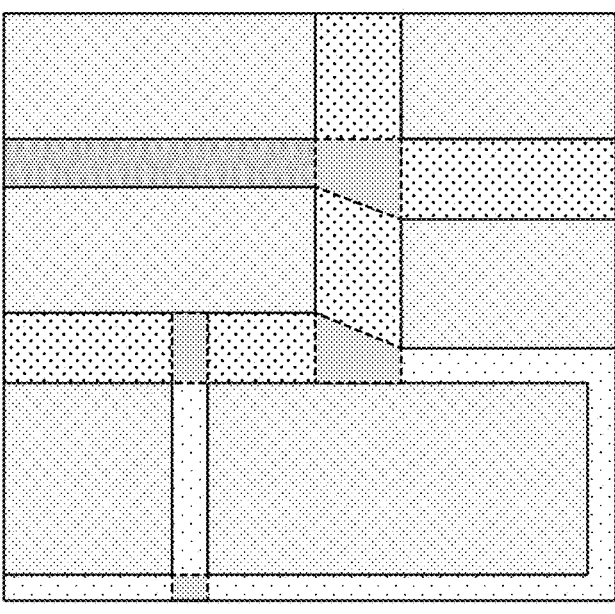
FIG. 10A is a diagram showing a presentation example of a map based on a data structure generated by the information processing device.
Figure 10B:
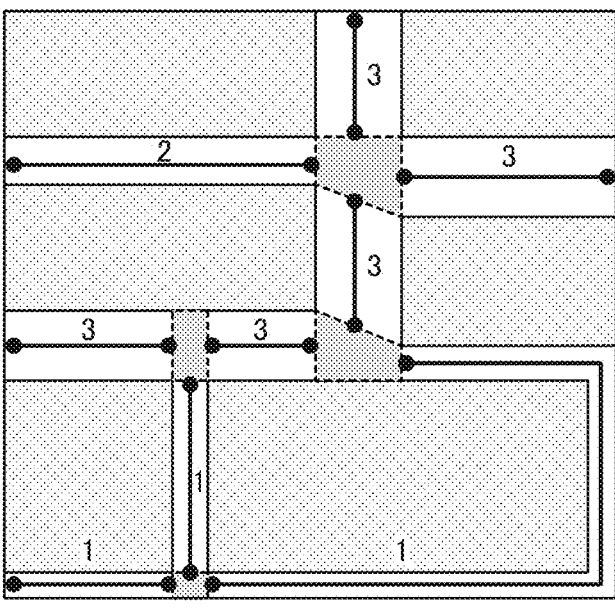
FIG. 10B is a diagram showing a presentation example of a map based on a data structure generated by the information processing device.
Figure 10C:
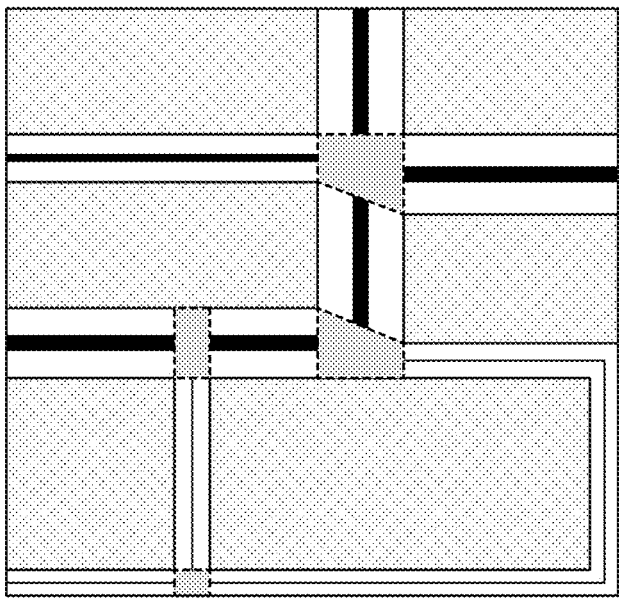
FIG. 10C is a diagram showing a presentation example of a map based on a data structure generated by the information processing device.
Figure 10D:
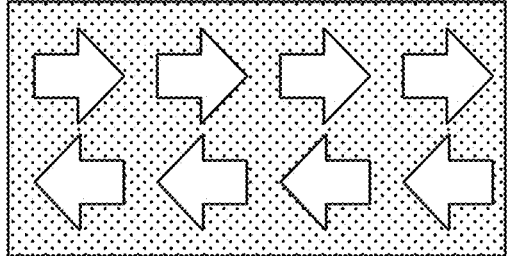
FIG. 10D is a diagram showing a presentation example of a map based on a data structure generated by the information processing device.

Now, presentation examples of a map based on a data structure generated by the information processing device 10 are illustrated. FIG. 10A to FIG. 10D are diagrams showing the presentation examples of the map based on the data structure generated by the information processing device 10. For example, as illustrated in FIG. 10A, the information processing device 10 may alter colors of the edges in accordance with the meeting conditions of the edges to present the meeting conditions. For another example, as shown in FIG. 10B, the information processing device 10 may display numbers in vicinities of the edges in accordance with the meeting conditions of the edges to present the meeting conditions. For another example, as shown in FIG. 10C, the information processing device 10 may alter thicknesses of lines in accordance with the meeting conditions of the edges to present the meeting conditions. For another example, as shown in FIG. 10D, the information processing device 10 may present the meeting condition of an edge by showing a progress direction of mobile robots in the edge.

Figure 11:
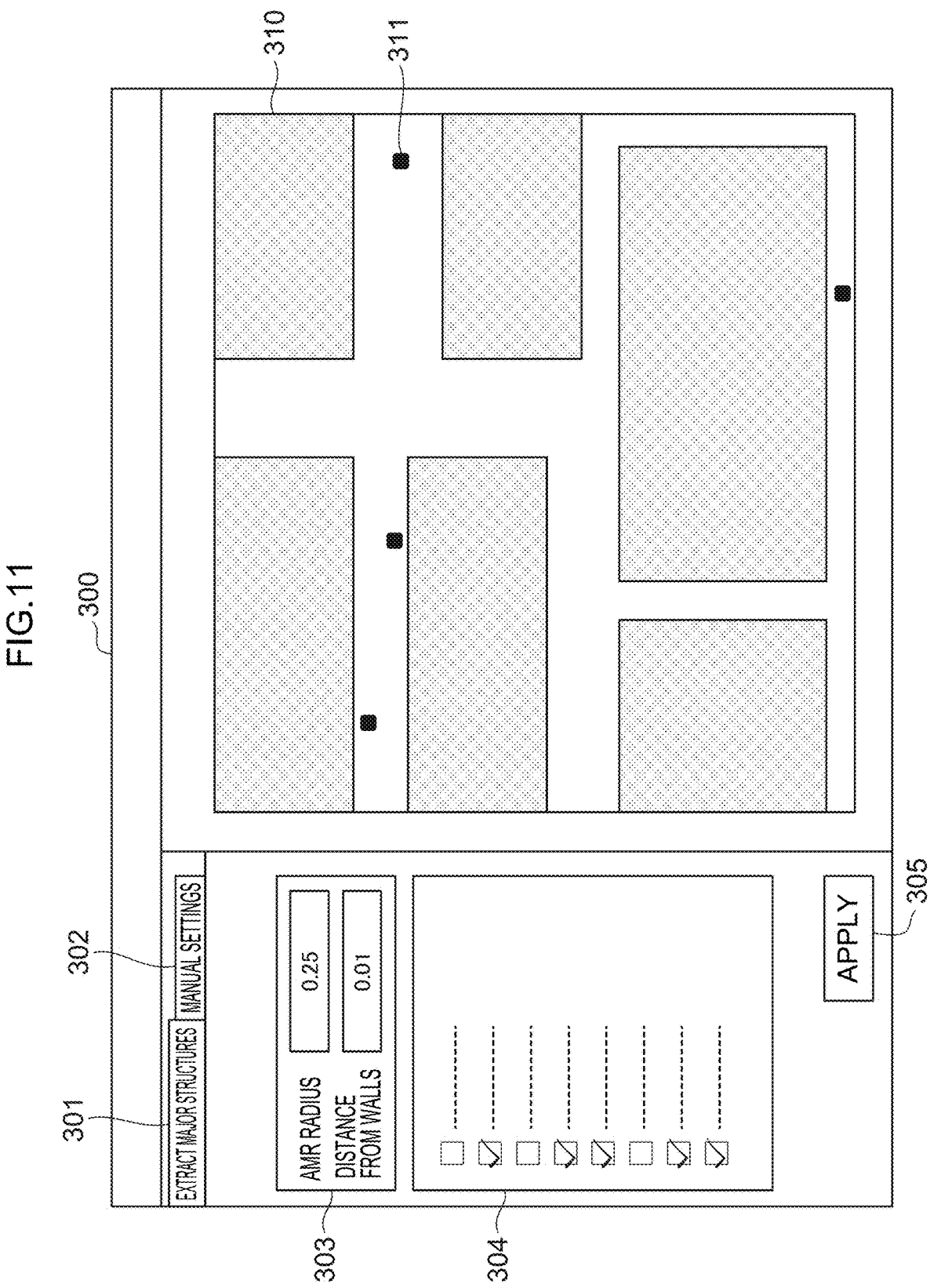
FIG. 11 is a diagram showing an example of a user interface displayed at a display unit by the information processing device.

Now, an example of a user interface displayed by the information processing device 10 is described. FIG. 11 is a diagram showing an example of the user interface displayed at the display unit 20 by the information processing device 10. A user interface 300 is a user interface for causing the information processing device 10 to output a data structure. The reference symbol 301 indicates a tab to be selected by a user when the information processing device 10 is to output a data structure based on a map and entry information from the user. The reference symbol 302 indicates a tab to be selected by a user when the data structure is to be outputted on the basis of manual settings by the user. The reference symbol 303 indicates a text box for entering information relating to the size of a mobile robot. In the example in FIG. 11, a radius of a mobile robot and a minimum distance from walls of speed-restricted areas may be entered as the information relating to the size of the mobile robot. Obviously, information relating to the sizes of mobile robots is not to be limited by this example.

The reference symbol 304 indicates an area for selecting constraint items that should be referred to when generating running plans of the mobile robots based on the data structure. The constraints to be referred to when generating running plans of mobile robots are now described. A map of an area in which plural people and mobile robots are present at the same time (a mixed traffic area) includes generally understood expertise, know-how or tacit knowledge for when generating a running plan for a mobile robot. The constraints displayed by the information processing device 10 in the area indicated by the reference symbol 304 list these expertise, know-how and tacit knowledge. Eight constraints are presented in the present exemplary embodiment. Examples of constraints, reasons for applying those constraints, and data-driven presentation methods are shown in Table 1.

TABLE 1

| No. | Constraint | Reason | Data-driven presentation method |
|---|---|---|---|
| 1 | Apply a one-way area constraint to a narrow edge | To prevent mobile robots interfering with each other | Voronoi processing and geometric processing |
| 2 | Apply a priority passage constraint for passing on one side of an area with multiple travel lanes | To reduce time wasted on avoidance movements due to interference | Voronoi processing and geometric processing |
| 3 | Apply a speed restriction to the vicinity of a goal | To reduce positioning errors on arrival at the goal | Geometric processing |
| 4 | Apply a speed-restricted area to the vicinity of a boundary with an imaginary wall | To reduce a risk of contact with a person, workbench or such in a mixed traffic area with workers | Voronoi processing and geometric processing |
| 5 | Provide a refuge zone in an area in which passage is unavoidable | For a mobile robot to wait for passage when another mobile robot is passing along a narrow travel lane | Voronoi processing |
| 6 | Apply a speed restriction to a passage with a width close to the width of a mobile robot | To reduce a risk of contact between the mobile robot and a wall | Voronoi processing and geometric processing |
| 7 | Apply a priority passage line designating a trajectory of mobile robots within an open space | To reduce interference between mobile robots and reduce time wasted on avoiding interference within the open space | Voronoi processing, geometric processing and graph processing |
| 8 | Apply a speed-restricted area to a turning point | To prevent mobile robots over-running at turns | Voronoi processing |

Figure 12A:
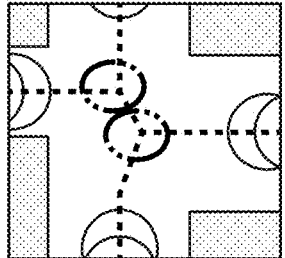
FIG. 12A is a diagram describing processing in a case of data-driven extraction of map information.
Figure 12B:
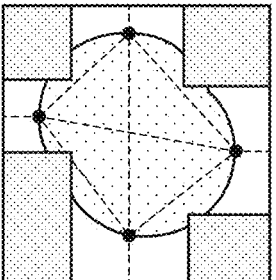
FIG. 12B is a diagram describing processing in a case of data-driven extraction of map information.
Figure 12C:
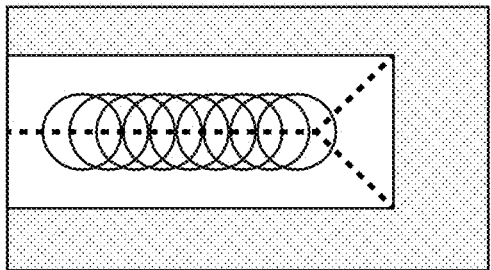
FIG. 12C is a diagram describing processing in a case of data-driven extraction of map information.
Figure 12D:
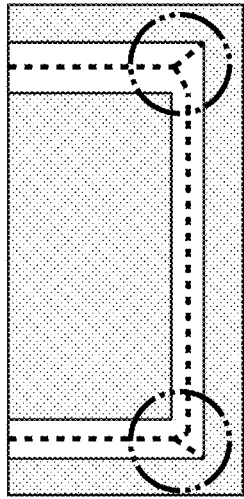
FIG. 12D is a diagram describing processing in a case of data-driven extraction of map information.

FIG. 12A to FIG. 12D are diagrams describing processing in cases of data-driven extraction of map information. FIG. 12A and FIG. 12B are diagrams describing processing when constraint No. 7 in Table 1 is set. In this situation, the CPU 12 extracts an open space with a number of connected endpoints in a Voronoi graph and links connection points between the open space and the edges in a graph of all connections to define a priority passage line. FIG. 12C is a diagram describing processing when constraints Nos. 1, 2 and 6 in Table 1 are set. In this situation, the CPU 12 defines (travel lanes×N) circles centered on Voronoi end points. FIG. 12D is a diagram describing processing when constraint No. 8 in Table 1 is set. In this situation, the CPU 12 uses a characteristic of only a single Voronoi line extending toward a wall to define turning points at locations corresponding to turning points of an edge and applies speed-restricted areas.

When constraint No. 3 in Table 1 is set, the CPU 12 finds a Voronoi endpoint that is closest to the goal position and plots an inscribed circle that is centered on the Voronoi endpoint and inscribed between imaginary walls to define a speed-restricted area. When constraint No. 4 in Table 1 is set, the CPU 12 defines a speed-restricted area by plotting an inscribed circle that is centered on a Voronoi endpoint and contacts the imaginary wall, reducing the radius of the circle by an amount corresponding to the speed-restricted area, making the imaginary wall bulge by morphology processing, and finding a difference from original coordinates.

FIG. 13 is a diagram showing an example of a data structure generated by the information processing device 10. In the data structure shown in FIG. 13, constraints designated by a user are added to the data structure shown in FIG. 7. The upper section of FIG. 13 is the same as the upper section of FIG. 7. The middle section of FIG. 13 is a table data structure storing information of an open space. This table stores information of an ID identifying the open space (OS-ID), a capacity of the open space, a surface area of the open space, nodes connected to the open space (connected node-IDs), and constraints of the open space. The lower section of FIG. 13 is a table data structure storing information of an edge. This table stores information of an edge ID, a start point node, an end point node, a meeting condition, a length of the edge, and constraints of the edge.

Figure 14:
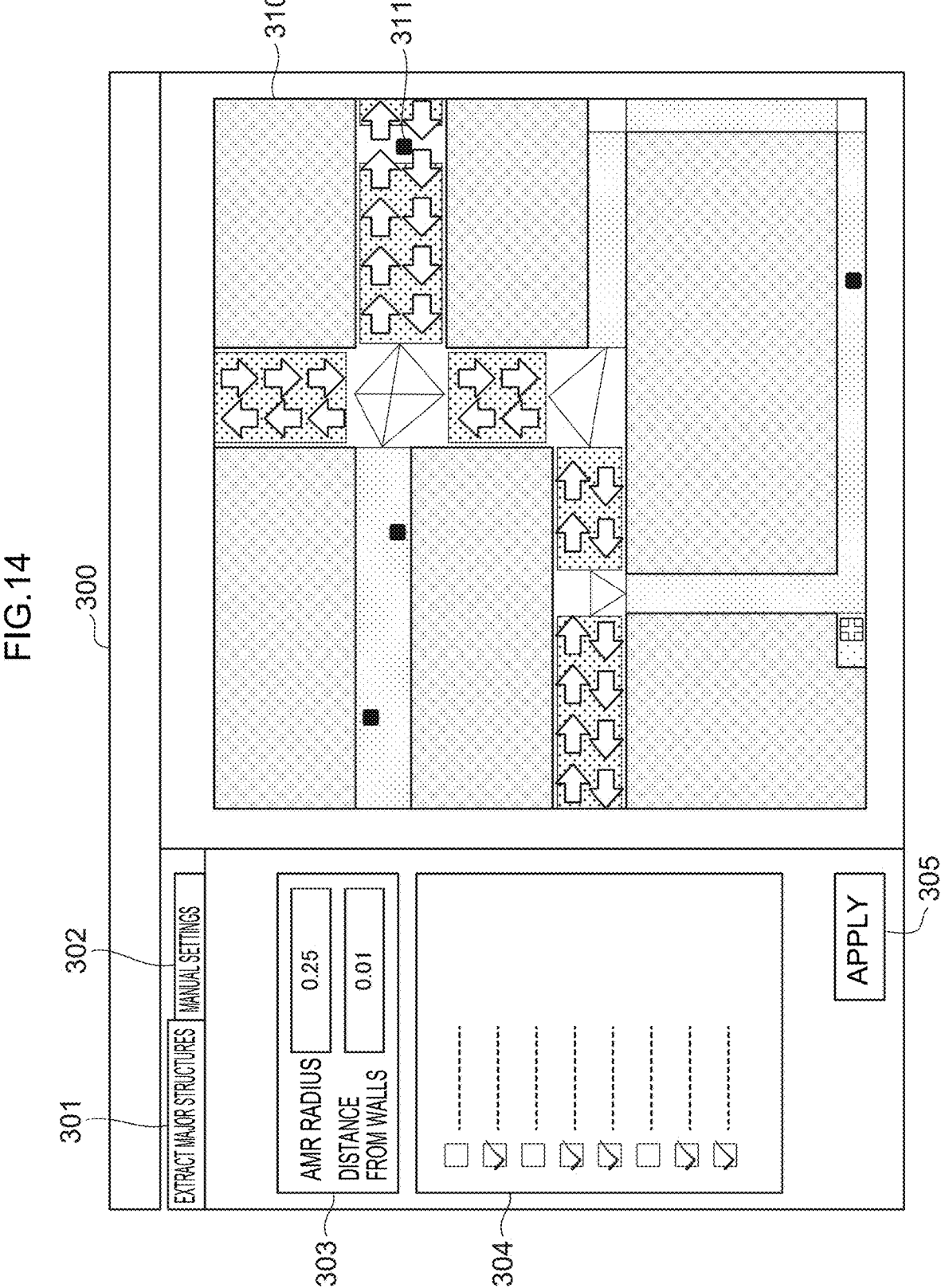
FIG. 14 is a diagram showing an example of a user interface displayed at the display unit by the information processing device.

FIG. 14 is a diagram showing an example of the user interface displayed at the display unit 20 by the information processing device 10. The example shown in FIG. 14 is a user interface that displays information based on the data structure generated by the information processing device 10 superimposed on a map. Because the information processing device 10 displays the information based on the data structure superimposed on the map, a user may anticipate states of movement of mobile robots on the map.

The information processing device 10 generating and outputting the data structure as described above may contribute to a reduction in labor for creating running plans of the mobile robots.

Figure 15:
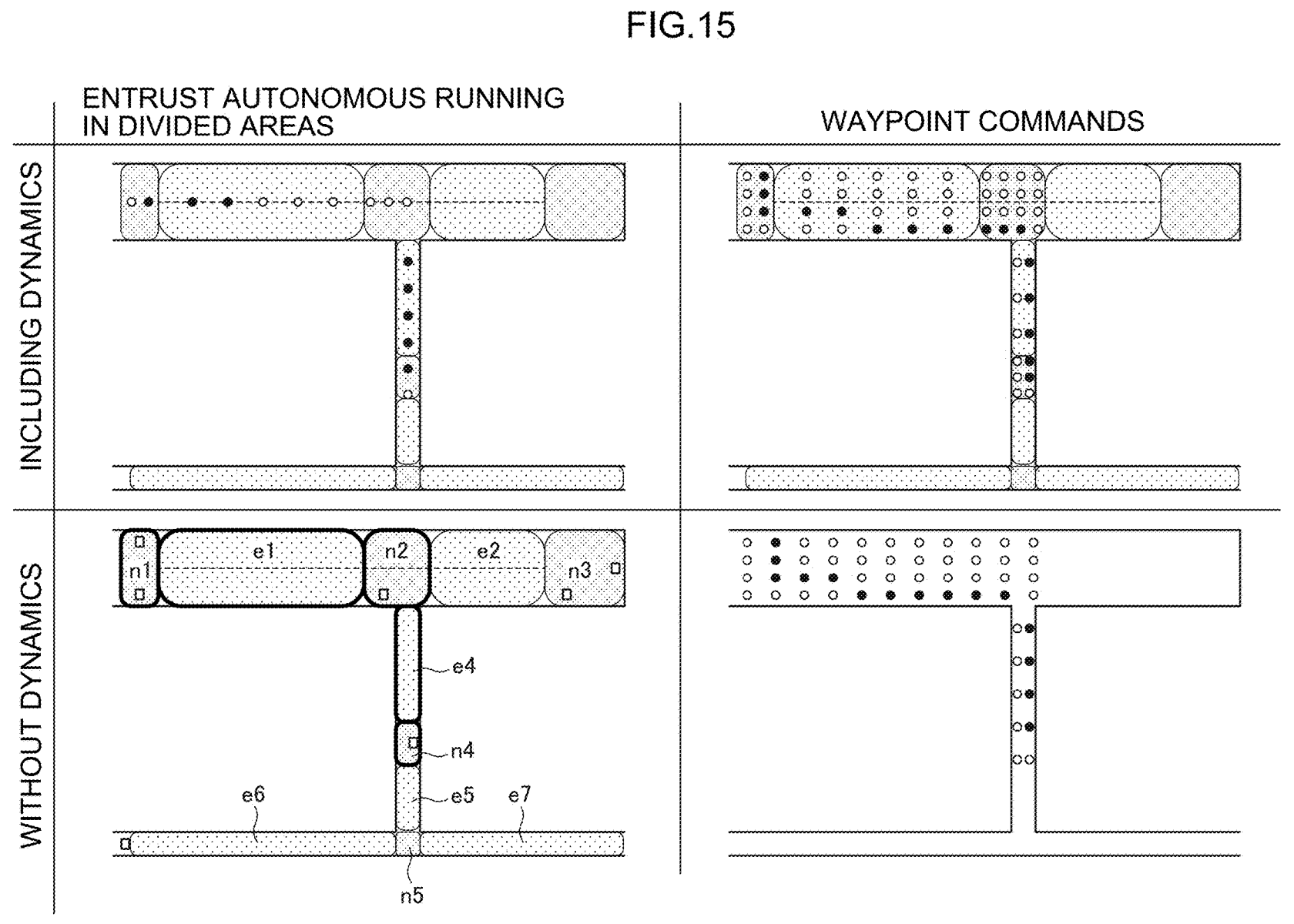

FIG. 15 is a diagram describing variations of creation of running plans for mobile robots. The column at the left side of FIG. 15 depicts a mode in which only general areas on a route along which mobile robots are to pass are designated from a server controlling running of the mobile robots. Movements in these areas are entrusted to control by autonomous running of the mobile robots. Interference avoidance between the mobile robots is left to autonomous control by the mobile robots. The column at the right side of FIG. 15 depicts a mode in which trajectories for mobile robots are designated from the server side as series of waypoints, which are more specific spatial coordinates. In this mode, avoidance of interference between the mobile robots may be commanded from the server side. Autonomous control by the mobile robots is used for purposes of avoiding interference with uncontrolled objects such as people and the like. The upper row in FIG. 15 depicts examples of formulating path plans with consideration for kinematics or dynamics of the mobile robots. For example, path plans are optimized with consideration for characteristics such as the mobile robots travelling fast in straight lines and travelling slowly when turning. The lower row of FIG. 15 depicts examples of formulating path plans without consideration for kinematics or dynamics of the mobile robots. In these examples, it is assumed that the mobile robots will operate cautiously and required path times are treated as being proportional to path lengths and the like.

In the example at the upper left of FIG. 15, the information processing device 10 quantifies and solves an MAPF (multi-agent path finding) problem for the extracted roadmap under constraints that take account of the dynamics of the mobile robots. In the example at the upper left of FIG. 14, the information processing device 10 may use collision determination information such as meeting conditions, capacities and the like in the roadmap areas to reduce optimization search computing.

In the example at the lower left of FIG. 15, the information processing device 10 quantifies and solves an MAPF problem for the extracted roadmap, treating movements of the mobile robots as uniform-speed linear running. In the example at the lower left of FIG. 15, the information processing device 10 may use collision determination information such as meeting conditions, capacities and the like in the roadmap areas to reduce optimization search computing. In the example at the lower left of FIG. 15, the respective extracted areas are indicated by, respectively, symbols n1 to n5 for open spaces and e1 to e7 for edges.

In the example at the upper right of FIG. 15, the information processing device 10 defines constraints that take account of dynamics of the mobile robots at grid points, and solves an MAPF problem and a motion planning problem simultaneously. The information processing device 10 may use roadmap area information including the grid points to alter definitions of dynamics between the grid points (for example, in passages and at intersections) to reduce computing quantities. In the example at the upper right of FIG. 15, the information processing device 10 may use collision determination information such as meeting conditions, capacities and the like in the roadmap areas to reduce optimization search computing.

The information processing that, in the exemplary embodiment described above, is executed by a CPU reading software (a program) may be executed by various kinds of processor other than a CPU. Examples of processors in these cases include a PLD (programmable logic device) in which a circuit configuration can be modified after manufacturing, such as an FPGA (field-programmable gate array) or the like, a dedicated electronic circuit which is a processor with a circuit configuration that is specially designed to execute specific processing, such as an ASIC (application-specific integrated circuit) or the like, and so forth. The information processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiment described above, a mode is described in which the information program is memorized in advance (installed) at the ROM or storage, but this is not limiting. The program may be provided in a mode that is recorded at a non-transitory recording medium such as a CD-ROM (compact disc read-only memory), DVD-ROM (digital versatile disc read-only memory), USB (universal serial bus) memory or the like. Modes are also possible in which the programs are downloaded from external equipment via a network.

EXPLANATION OF THE REFERENCE SYMBOLS

10 information processing device
200 Map
300 User interface

The invention claimed is:

1. An information processing device, comprising:
an acquisition unit that acquires:
    a map that distinguishes a passable area for mobile robots from an impassable area, and information relating to a size of the robots;
a processing unit that:
    divides the passable area of the map into a first area in which a travel direction of the robots is determined and a second area in which a travel direction of the robots is not determined, and
    uses the information relating to the size of the robots to generate a predetermined data structure storing information on whether or not the robots can pass by each other in the first area as first area information and storing information on a number of the robots that can be present simultaneously as second area information; and
an output unit that outputs the data structure generated by the processing unit.

2. The information processing device according to claim 1, wherein the processing unit stores information relating to a limit on movements of the robots in the first area or the second area in the data structure.

3. The information processing device according to claim 2, wherein the acquisition unit acquires information relating to the limit that is entered by a user.

4. The information processing device according to claim 1, wherein the processing unit stores information of a surface area of the second area in the data structure as the second area information.

5. The information processing device according to claim 1, wherein the processing unit stores information relating to a progress direction of the robots in the data structure as information relating to the first area.

6. The information processing device according to claim 1, wherein the processing unit:
extracts the second area from the passable area, and
extracts the first area from the passable area excluding the extracted second area.

7. The information processing device according to claim 1, wherein the acquisition unit acquires information relating to sizes of the robots that differs between types of the robots.

8. The information processing device according to claim 1, further comprising a display control unit that causes the map to be displayed, the displayed map reproducing information stored in the data structure.

9. The information processing device according to claim 1, wherein the processing unit generates a path plan of the robots based on information stored in the data structure.

10. An information processing method, comprising:
acquiring a map that distinguishes a passable area for mobile robots from an impassable area, and information relating to a size of the robots;
generating a predetermined data structure, including:
    dividing the passable area of the map into a first area in which a travel direction of the robots is determined and a second area in which a travel direction of the robots is not determined, and
    using the information relating to the size of the robots to generate the data structure, the data structure storing information on whether or not the robots can pass by each other in the first area as first area information and storing information on a number of the robots that can be present simultaneously as second area information; and
outputting the generated data structure.

11. A non-transitory storage medium storing a computer program that is executable by a computer to execute processing, the processing comprising:
acquiring a map that distinguishes a passable area for mobile robots from an impassable area, and information relating to a size of the robots;
generating a predetermined data structure, including:
    dividing the passable area of the map into a first area in which a travel direction of the robots is determined and a second area in which a travel direction of the robots is not determined, and
    using the information relating to the size of the robots to generate the data structure, the data structure storing information on whether or not the robots can pass by each other in the first area as first area information and storing information on a number of the robots that can be present simultaneously as second area information;
generating the predetermined data structure storing the first area information and the second area information; and
outputting the generated data structure.

\* \* \* \* \*